H. TAYLOR.
SELECTIVE DEVICE.
APPLICATION FILED SEPT. 14, 1915.
1,165,465. Patented Dec. 28, 1915.
3 SHEETS—SHEET 1.
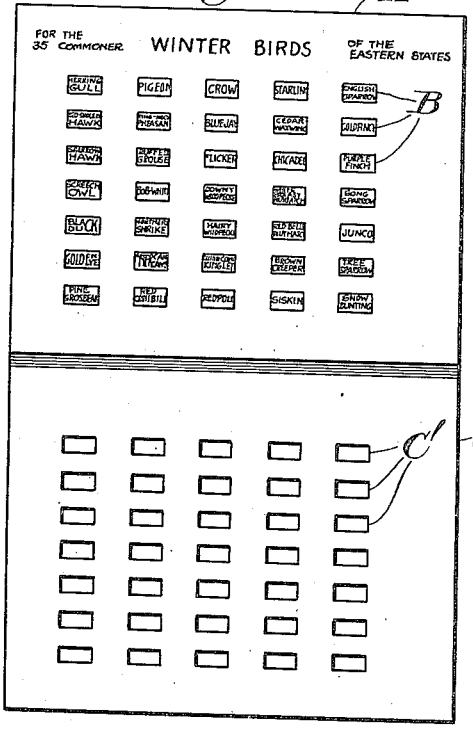
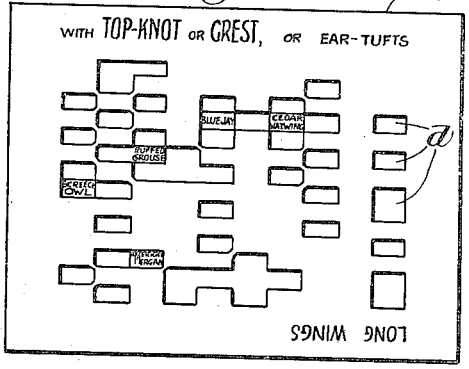
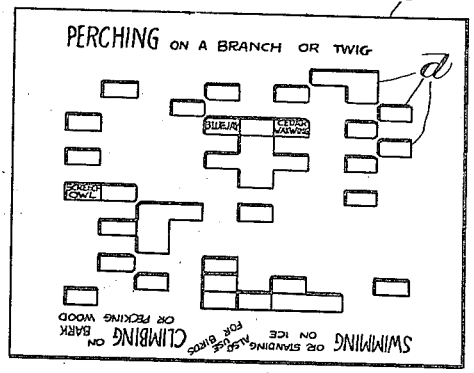
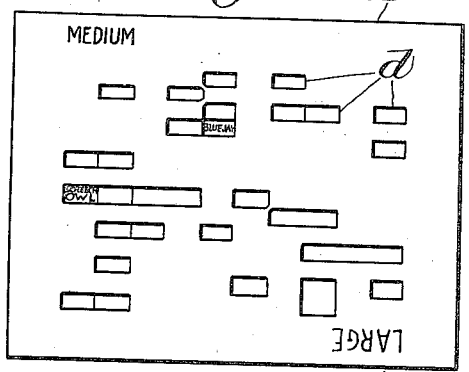
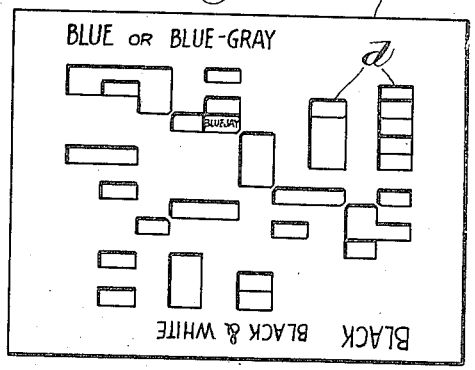
Inventor:
Horace Taylor,
by Roberts, Roberts & Cushman
Attorneys

H. TAYLOR.
SELECTIVE DEVICE.
APPLICATION FILED SEPT. 14, 1915.

1,165,465.

Patented Dec. 28, 1915.
3 SHEETS—SHEET 2.

Inventor:
Horace Taylor,
by Roberts, Roberts & Cushman
Attorneys.

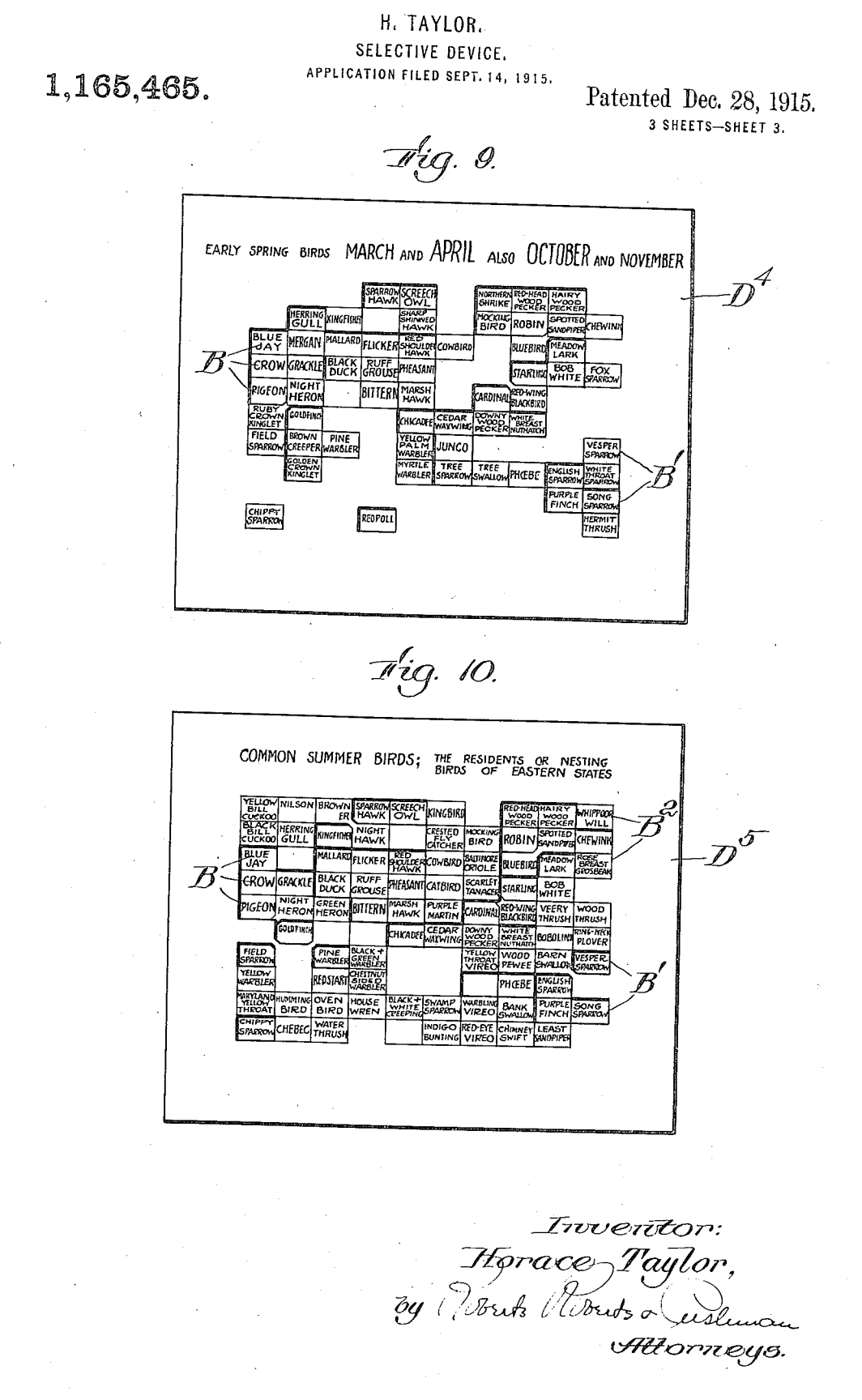

H. TAYLOR.
SELECTIVE DEVICE.
APPLICATION FILED SEPT. 14, 1915.

1,165,465.

Patented Dec. 28, 1915.
3 SHEETS—SHEET 3.

*Fig. 9.*

*Fig. 10.*

Inventor:
Horace Taylor,
by Roberts, Roberts & Cushman
Attorneys.

UNITED STATES PATENT OFFICE.

HORACE TAYLOR, OF BROOKLINE, MASSACHUSETTS.

SELECTIVE DEVICE.

1,165,465.

Specification of Letters Patent.   Patented Dec. 28, 1915.

Application filed September 14, 1915.   Serial No. 50,720.

*To all whom it may concern:*

Be it known that I, HORACE TAYLOR, a citizen of the United States, and resident of Brookline, in the county of Norfolk and State of Massachusetts, have invented new and useful Improvements in Selective Devices, of which the following is a specification.

My invention relates to selective apparatus comprising essentially a foundation sheet or chart having distributed thereon indications of subject-matter, such as the names of things, symbols, signs, or pictures, classifiable into several species as to characteristics, and a screen sheet or mask perforated with relation to the distribution of the indications on the foundation sheet and adapted to be superposed thereon to disclose those portions of the indications of subject-matter which possess a common characteristic and at the same time to obscure from view portions of the indications on said foundation sheet which do not possess said common characteristic.

In certain forms of my invention, as hereinafter more particularly described, the screen sheet or mask bears on its imperforate portion indications of data of common species as to a characteristic with that represented on the foundation sheet and disclosed by the perforate portion of the screen sheet when the latter is superposed thereon; and the foundation sheet or chart may then be of composite character comprising the foundation sheet proper with one or more such screen sheets superposed thereon.

The object of the invention is to provide an apparatus whereby from a given group of names or other indications of subject-matter classifiable into several species as to characteristics, a particular species or a particular member of a particular species may be selected with ease and accuracy.

Figure 6:
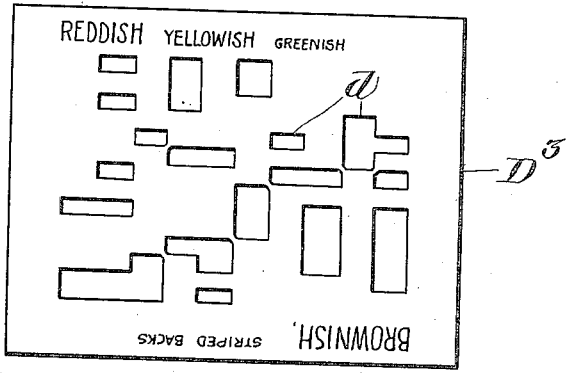
Figure 7:
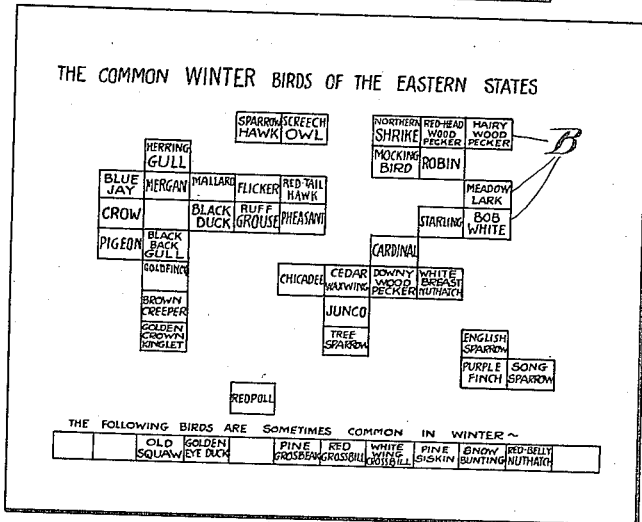
Figure 8:
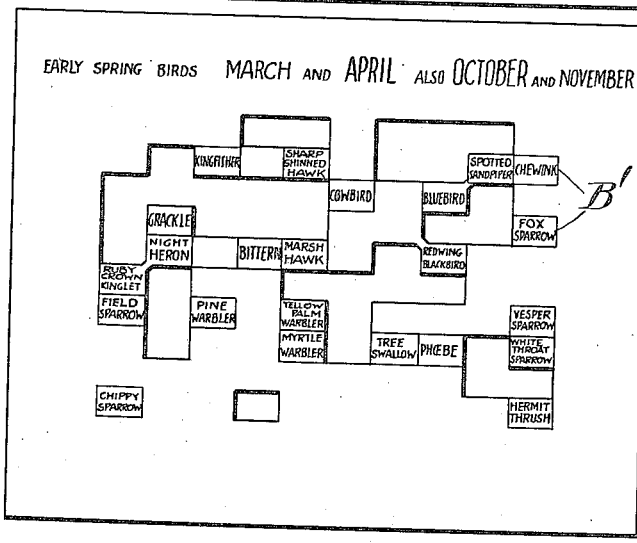

Referring to the drawings which illustrate certain embodiments of my invention, Figure 1 is a plan view of a foundation sheet forming part of my invention; Fig. 2 is a similar view of a screen sheet or mask, superposed on the foundation sheet shown in Fig. 1; Fig. 3 is a similar view of another screen sheet superposed on the foundation sheet and mask shown in Fig. 2; Fig. 4 is a similar view of another screen sheet superposed on the foundation sheet and masks shown in Fig. 3; Fig. 5 is a similar view of another screen sheet, superposed on the foundation sheet and masks shown in Fig. 4; Fig. 6 is a similar view of the reverse side of the screen sheet shown in Fig. 5; Fig. 7 is a similar view of another form of foundation sheet; Fig. 8 is a similar view of a combined foundation and screen sheet; Fig. 9 is a similar view of the sheet shown in Fig. 8, superposed on the foundation sheet shown in Fig. 7; and Fig. 10 is a similar view of another screen sheet superposed upon the two sheets shown in Fig. 9.

Referring to Figs. 1 to 6 inclusive, A is the foundation sheet or chart plate made of cardboard or any other suitable material, upon which classifiable data is distributed, as for example the names, B, of the common winter birds of the Eastern States. It will be understood that the specific example shown is illustrative merely and that the data may be not only the names of objects of nature, books, pictures, historical events, and the like, but also signs and symbols, in short, any group of data classifiable into several species as to characteristic, and therefore requiring selection to determine a particular species of the group or a particular member of a particular species. Preferably a cover or folder C is pivotally secured to the sheet A and adapted to be folded upon it. The said cover is provided with perforations C' arranged to register with the names B so that the said names are disclosed when the cover is in folded or closed position. D, D', D², D³, are screen sheets or masks, made of cardboard or any other suitable material, and having perforations *d* arranged with relation to the distribution of the names B (or other information or data) on the sheet A, so that when superposed thereon the names B which form a species as to a common characteristic are disclosed, and the remainder of said names obscured from view. For example, the screen shown in Fig. 2 is so perforated with relation to the distribution of information on the foundation sheet A that when superposed thereon in the position shown in Fig. 2 it will disclose all the names of all the birds thereon having the common characteristic of a topknot or crest, obscuring from view birds not having this characteristic. The perforations *d* on each of said screen sheets or masks are so arranged that the sheet may be superposed on the foundation sheet in four positions or aspects, that is, it may be reversed top for bottom or front for back, producing a different result in each case. Thus, the screen sheet D³ (Fig. 5) if superposed in the position shown in said figure, will disclose the names of all the birds in the group which are blue or blue-gray, obscuring others from view; or if turned end for end and superposed with the word "Black" at the top, will disclose the names of all birds in the group which are black, obscuring others from view; or if reversed front for back, and superposed in the position shown in Fig. 6, will disclose the names of all birds in the group which are reddish, obscuring others from view; or if turned end for end and superposed with the word "Brownish" at the top, will disclose the names of all the birds in the group which are brown or brownish, obscuring others from view.

The operation of the apparatus is as follows: Suppose that a winter bird of the Eastern States has been observed and its marked characteristics noted, but its identity is unknown to the observer or a doubt thereof exists. Upon the foundation sheet A bearing the group of names of the eastern winter birds, there is superposed the screen sheet or mask D (Fig. 2) which has at its top the first characteristic of the bird noted by the observer, namely, that it was crested. The superposing of this screen sheet discloses the names of five birds having a topknot or crest, obscuring the remainder of the group from view. It thus appears that the bird observed may have been any one of five, and therefore it is necessary to resort to a further characteristic noted by the observer, as, for example, that the bird was perching on a branch. The screen sheet D' (Fig. 3) is thereupon superposed on the apparatus as shown in Fig. 2, i. e. upon the screen D superposed on the foundation sheet A, with the result that two more of the names upon the foundation sheet are obscured from view, and the names of three birds are disclosed which are both crested and commonly perch upon branches or twigs. Reference is therefore had to another characteristic noted by the observer, namely, that the bird was of medium size. Thereupon the screen sheet D² (Fig. 4) is superposed upon the apparatus as shown in Fig. 3, with the result that one more name upon the foundation sheet is obscured and the names of two birds are disclosed which are crested, commonly perch on branches, and are of medium size. Reference is therefore had to still another characteristic of the bird noted, namely, that it was of a blue or blue-gray color, and the screen sheet D³ (Fig. 5) is superposed upon the apparatus as shown in Fig. 4, with the result that all but one of the names upon the foundation sheet are obscured from view and it is determined that the bird observed was a blue jay.

Instead of the foundation sheet A shown in Fig. 1, it may be desirable to employ a composite foundation sheet comprising the foundation sheet proper, with one or more screen sheets superposed thereon. In the form of my invention shown in Figs. 7 to 10 inclusive, the screen sheets D⁴, D⁵, are the same in principle as those already described, except that they bear on their imperforate portions data of common species as to characteristics with that represented by the data on the foundation sheet which is disclosed by the perforate portions of the screen when superposed, but differing as to specific characteristic from the data on the foundation sheet obscured from view by the superposed screen sheet. Thus, in the specific example, the foundation sheet A' (Fig. 7) has distributed thereon a group of names of the common winter birds of the Eastern States. The screen sheet D⁴ (Fig. 8) is adapted to be superposed thereon and bears upon its imperforate portions the names of birds B' to be seen in the Eastern States in the early spring, March and April, and late autumn, October and November. When, now, the screen sheet D⁴ is superposed on the foundation sheet A' (Fig. 9) it obscures from view the names of such of the winter birds as may not be resident of the Eastern States in March and April or in October and November, and discloses the names of such of the birds as are residents not only in the winter but in March and April or in October and November, so that the superposing of the screen sheet (Fig. 9) results in a composite foundation sheet having the names of all the birds likely to be seen in March and April and October and November, including those winter birds which remain, as well as the birds peculiar to spring and autumn.

The screen D⁵ (Fig. 10) bears on its imperforate portions the names of the birds B², which are resident of the Eastern States during the summer only, and when superposed on the apparatus as shown in Fig. 9, obscures from view names of winter birds on the foundation sheet A', and spring or autumn birds on the screen D⁴, which are not resident in the summer and discloses the names of all the birds to be seen in the summer, i. e. those of the "winter birds," as the sparrow hawk; those of the "spring birds," as the robin, and those of the birds resident in summer only, as the scarlet tanager.

It will be clear that screen sheets of the character shown in Figs. 2 to 6 inclusive may be superposed on the composite foundation sheets shown in Figs. 9 and 10, in exactly the same way as upon the foundation sheet A, and with the same results.

The selective apparatus above described is of simple mechanical construction and may be so compactly made as to be readily carried about, as for example, in field work out of doors by day or night, or in art galleries and the like. By reason of the fact that the screen sheets can be superposed in any combination, and that each may be used in four positions or aspects obtaining a different result in each position, the number of screen sheets necessary for a given group of data is not large, and therefore the selection of the proper screens in proper positions or aspects to bring about the desired selection is rendered easy. The data or information, whether verbal symbolical or pictorial, adapted for selection by this apparatus, is practically unlimited, and such selection is accomplished with ease and accuracy.

Throughout the specification and claims I have used the words "perforated" and "perforations" to denote the areas in the screen sheets or masks through which the underlying sheet or sheets are exposed to view. It is to be understood that such areas might be closed by transparent material as well as being left physically open, without departing from the invention, and said terms are intended to include any areas through which the observer can see, as contrasted with the opaque body of the screen, whether such "perforated" areas are wholly open or closed by transparent material.

I claim:

1. The combination of a foundation sheet bearing indications of subject-matter classifiable into several species as to characteristics, and a screen sheet perforated with relation to the distribution of said indications on the foundation sheet to disclose when superposed on the foundation sheet such of said indications as form a species as to a common characteristic, and at the same time to screen from view indications which do not possess said characteristic.

2. The combination of a foundation sheet bearing indications of subject-matter classifiable into several species as to characteristics, and a screen sheet perforated with relation to the distribution of said indications on the foundation sheet to disclose such of said indications as form a species as to a common characteristic when superposed on said foundation sheet in one aspect, and to disclose such of said indications as possess another characteristic in common, when superposed on said foundation sheet in another aspect, and at the same time to screen from view indications which do not possess the characteristic of subject-matter of which the indications are disclosed when the screen sheet is superposed on the foundation sheet in either aspect.

3. The combination of a foundation sheet bearing indications of subject-matter classifiable into several species as to characteristics, and a screen sheet, reversible top for bottom and front for back, and so perforated with relation to the distribution of said indications on the foundation sheet, that when superposed on the foundation sheet the screen sheet will disclose in any of its four positions, through its perforations, such of the indications on the foundation sheet as form a species as to a common characteristic, differing from the species disclosed in its other positions, and at the same time will screen from view indications which do not possess the characteristic of the subject-matter of which the indications are for the time being disclosed.

4. The combination of a foundation sheet bearing indications of subject-matter classifiable into several species as to characteristics, and a plurality of screen sheets, each perforated with relation to the distribution of said indications on the foundation sheet, the perforations being so disposed as to register with indications on the foundation sheet of matter forming a species as to a common characteristic, said several screen sheets being differently perforated to register with indications of different species and also being adapted to be superposed on the foundation sheet in any order for the purpose, when combined, of exposing such indications of subject-matter on the foundation sheet as may possess the characteristics common to several species.

5. The combination of a foundation sheet bearing indications of subject-matter classifiable into several species as to characteristics, and a plurality of screen sheets, each perforated with relation to the distribution of said indications on the foundation sheet, the perforations being so disposed as to register with indications on the foundation sheet of matter forming a species as to a common characteristic, said several screen sheets being differently perforated to register with indications of different species and also being adapted to be superposed on the foundation sheet in any order and in various positions for the purpose, when combined, of exposing such indications of subject-matter on the foundation sheet as may possess the characteristics common to several species.

6. The combination of a foundation sheet bearing indications of subject-matter classifiable into several species as to characteristics, and a screen sheet perforated with relation to the distribution of said indications on the foundation sheet to disclose when superposed on the foundation sheet such of said indications as form a species as to a common characteristic, and at the same time to screen from view indications which do not possess said characteristic, said screen sheet bearing on its imperforate portions indications of subject-matter of common species as to a characteristic with those represented by the indication on the foundation sheet disclosed by the perforate portions of the screen sheet, but differing as to a specific characteristic from the subject-matter of which the indications on the foundation sheet are concealed by the screen sheet.

7. The combination of a foundation sheet and a plurality of screen sheets superposable one on the other in predetermined series, the foundation sheet bearing indications of subject-matter classifiable into several species as to characteristics, the screen sheet destined to superposition upon the foundation sheet being perforated with relation to the distribution of indications on the foundation sheet to disclose when so superposed, indications of such of said subject-matter as forms a species as to a common characteristic and at the same time to screen from view indications of said subject-matter which do not possess said characteristic, said screen sheet also bearing on its imperforate portions indications of subject-matter of common species as to a characteristic with those represented by the indications on the foundation sheet disclosed by the perforated portions of said screen sheet but differing as to specific characteristic from the subject-matter of which the indications on the foundation sheet are concealed by said screen sheet, the other screen sheets successively to be superposed in series being perforated with relation to the indications of subject-matter visible on the sheets preceding in series, to disclose indications of such subject-matter as form a species as to a characteristic different from that which qualified the previously disclosed species, each of said successive screen sheets bearing indications of subject-matter of common species as to characteristic with those represented by the indications disclosed by the perforations of said sheets, the functional relationship between each screen sheet and the several sheets preceding in series being the same in kind as that between the foundation sheet and the screen sheet superposed directly upon it.

Signed by me at Boston, Massachusetts, this 10th day of September, 1915.

HORACE TAYLOR.

Witnesses:
ROBERT CUSHMAN,
CHARLES D. WOODBERRY.